US007269904B2

(12) United States Patent
Schmidt et al.

(10) Patent No.: US 7,269,904 B2
(45) Date of Patent: Sep. 18, 2007

(54) PORTABLE HANDHELD WORK APPARATUS

(75) Inventors: Roland Schmidt, Korb (DE); Manfred Rabis, Schorndorf (DE); Antonio Fattorusso, Leinfelden (DE); Hans Nickel, Weissach (DE); Patrick Schlauch, Reutlingen (DE); Olaf Schmidt, Korb (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 137 days.

(21) Appl. No.: 11/065,130

(22) Filed: Feb. 24, 2005

(65) Prior Publication Data

US 2005/0183270 A1 Aug. 25, 2005

(30) Foreign Application Priority Data

Feb. 25, 2004 (DE) ...................... 10 2004 009 180

(51) Int. Cl.
*B27B 17/00* (2006.01)
*B23D 57/02* (2006.01)

(52) U.S. Cl. .......................... 30/381; 56/10.8; 74/491; 173/170

(58) Field of Classification Search .......... 30/381–383; 173/170; 74/491, 501.5 H, 501.5 R, 501.6, 74/502.4, 504, 519, 523; 56/10.8, DIG. 4, 56/DIG. 6

See application file for complete search history.

(56) References Cited

U.S. PATENT DOCUMENTS 1,825,109 A * 9/1931 Worthington .................... 56/7
3,075,029 A * 1/1963 Michaud ..................... 123/624
3,444,950 A * 5/1969 Uitvlugt ..................... 180/174
3,774,303 A * 11/1973 Burkett et al. ................ 30/382
4,270,501 A * 6/1981 Breen et al. ................ 123/350
4,302,880 A * 12/1981 Elfving et al. ................ 30/382
4,382,333 A * 5/1983 Nagashima et al. .......... 30/381
4,785,539 A * 11/1988 Nagashima .................. 30/381
4,896,425 A * 1/1990 Henriksson .................. 30/381
4,928,458 A * 5/1990 Muroya et al. .............. 56/11.8
5,018,492 A * 5/1991 Wolf et al. ............. 123/198 E
5,029,393 A * 7/1991 Nagashima et al. .......... 30/383
6,301,865 B1 * 10/2001 Velke et al. ................. 56/16.7

* cited by examiner

*Primary Examiner*—Boyer D. Ashley
*Assistant Examiner*—Edward Landrum
(74) *Attorney, Agent, or Firm*—Walter Ottesen

(57) ABSTRACT

A portable handheld work apparatus such as a motor-driven chain saw (1) includes a housing (2) wherein an internal combustion engine (10) and a carburetor (11) are mounted. A throttle lever (6) is provided which is pivotally journalled on a handle (3). The handle (3) is connected to the housing (2) via at least one antivibration element (33). A vibration gap (9) is configured between the handle (3) and the housing (2). A transmitting unit (13) is provided for transmitting the pivot movement of the throttle lever (6) to the carburetor (11). The transmitting unit includes a rigid transmitting element (17, 37) which bridges the vibration gap (9). A simple configuration and a substantial decoupling of the relative movement between the housing (2) and the handle (3) from the actuating movement of the carburetor is achieved in that the transmitting element (17, 37) is rotatably journalled and the pivot movement of the throttle lever (6) is transmitted as a rotation about a rotational axis (22) lying transverse to the vibration gap (9).

25 Claims, 4 Drawing Sheets

PORTABLE HANDHELD WORK APPARATUS

CROSS REFERENCE TO RELATED APPLICATION

This application claims priority of German patent application no. 10 2004 009 180.3, filed Feb. 25, 2004, the entire content of which is incorporated herein by reference.

BACKGROUND OF THE INVENTION

U.S. Pat. No. 4,896,425 discloses a motor-driven chain saw wherein a vibration gap is formed between the throttle lever and the carburetor. This vibration gap is bridged by a transmitting element. The transmitting element transmits the movement of the throttle lever as a movement in the direction of the primary vibration direction, that is, parallel to the extension of the guide bar of the chain saw. In order to compensate for vibrations, the throttle lever is journalled in an elongated slot on the handle and the transmitting element is journalled in an elongated slot on the throttle lever. In this way, there is, however, lost motion during the actuation of the throttle lever.

SUMMARY OF THE INVENTION

It is an object of the invention to provide a portable handheld work apparatus of the kind described above wherein a good decoupling of the actuating movement of the throttle flap from the operating vibration is made possible in a simple manner and wherein a good adjustability of a fuel-metering device is made possible.

The portable handheld work apparatus of the invention includes: a housing; an internal combustion engine mounted in the housing; a fuel-metering device for metering fuel to the internal combustion engine; a handle; at least one antivibration element connecting the handle to the housing; the handle and the housing conjointly defining a vibration gap therebetween; a throttle lever pivotally journalled on the housing so as to execute a pivotal movement; a transmitting unit for transmitting the pivotal movement of the throttle lever to the fuel-metering device; the transmitting unit including: a rigid transmitting element for bridging the vibration gap; support means for rotatably supporting the transmitting element so as to permit rotation thereof about a rotational axis transverse to the vibration gap; and, interface means for operatively connecting the throttle lever to the transmitting element so as to cause the transmitting element to transmit the pivotal movement as a rotation about the rotational axis.

The pivot movement of the throttle lever is transmitted as a rotation about a rotational axis lying transversely to the vibration gap. For this reason, the actuating movement is decoupled from vibrations in the direction of the rotational axis. The transmitting unit can be configured simply and robustly and is thereby not susceptible to disturbances. The transmitting unit can be manufactured easily because no tight tolerances need be maintained.

A good decoupling results when the rotational axis runs approximately parallel to the primary vibration direction of the work apparatus. Movements in the direction of the rotational axis are not transmitted by the transmitting unit so that, in this direction, a complete decoupling is possible. Advantageously, the transmitting unit has a first region on which the throttle lever acts and a second region which acts on the fuel-metering unit. The transmitting element is advantageously held on a first support so as to be not displaceable in the direction of the rotational axis and is supported on a second support displaceable in the direction of the rotational axis. In this way, a fixed support is realized at one support and a loose support is realized at a second support. The relative movements between handle and housing can be compensated via the loose support so that the transmitting element is not loaded in the longitudinal direction. Here, preferably one support is provided on the housing and one support is provided on the handle.

The first support is mounted on the handle and the second support on the housing. In this way, the transmitting element is tightly journalled on the handle. One support is advantageously mounted between the first and second regions of the transmitting unit and one support is advantageously mounted on the end of the second region facing away from the first region.

The transmitting element is loose at one end and is tightly journalled between the first and second regions. The distance of the first support to the second region is short compared to the distance of the second support to the first support in order to ensure that also vibrations transverse to the rotational axis have only a slight influence on the fuel-metering unit. The second support is arranged directly adjacent to the second region. Relative movements between the two supports in a direction transverse to the rotational axis are transmitted only fractionally to the fuel-metering unit since a reduction takes place because of the lever ratios. The movement of the second region transverse to the rotational axis amounts to a fraction of the total relative movement which corresponds to the ratio of the distance of the second region to the second support to the distance between the two supports.

It is provided that the fuel-metering unit is a carburetor and the second region of the transmitting unit acts on a throttle shaft of the carburetor. The rotational axis of the throttle shaft advantageously lies transversely to the rotational axis of the transmitting element. In this way, an advantageous spatial arrangement of the carburetor and of the engine results. A dog is fixed on the throttle shaft at a radial distance to the rotational axis of the throttle shaft and this dog is actuated by the second region.

In order that there is a sufficiently large actuating movement for the throttle shaft and a slight relative movement between the dog and the second region, it is provided that the rotational axis of the throttle shaft has a short distance to the rotational axis of the transmitting element referred to the movement of the dog from the idle position to the full-load position and that the rotational axis of the throttle shaft intersects the rotational axis of the transmitting element. The rotational axis of the throttle shaft and the rotational axis of the transmitting element therefore advantageously lie in a plane.

Advantageously, the following lie approximately in a plane: the rotational axis of the throttle flap, the rotational axis and the second region in the area of the half-throttle position. In this way, an actuation of the throttle shaft results which is symmetrical to the half-throttle position. With the half-throttle position, the position of the throttle shaft is identified wherein the throttle shaft is, starting from an end position, pivoted about half of its entire deflection. At the same time, an adequately large actuating path and a small relative movement is ensured between the second region and the dog. With the small relative movement optimally assured, the friction and therefore the wear between the second region and the dog is reduced so that a long service life of the transmitting device can be achieved and the amount of force developed by the operator is low.

A simple configuration of the transmitting unit can be achieved when the first region is arranged on an arm projecting from the transmitting element. The second region is advantageously offset parallel to the rotational axis. The transmitting element can be configured as a rigid wire. The wire can be bent in a simple manner so that the first and second regions are integrated. Tolerances from the bending operation of the wire can be compensated by a one-time adaptation after the assembly so that only slight requirements need be imposed on the bending operation. In this way, a simple and economic manufacture results.

It can be practical to configure the first region as a slot formed in the transmitting element. The slot extends helically about the rotational axis and a lug is guided in the slot with the lug being fixed to the throttle lever. The second region is advantageously configured on a projecting arm. It is practical when the transmitting element is configured as a shaft. The shaft has a robust configuration and can be easily manufactured. The supports can also be simply configured.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
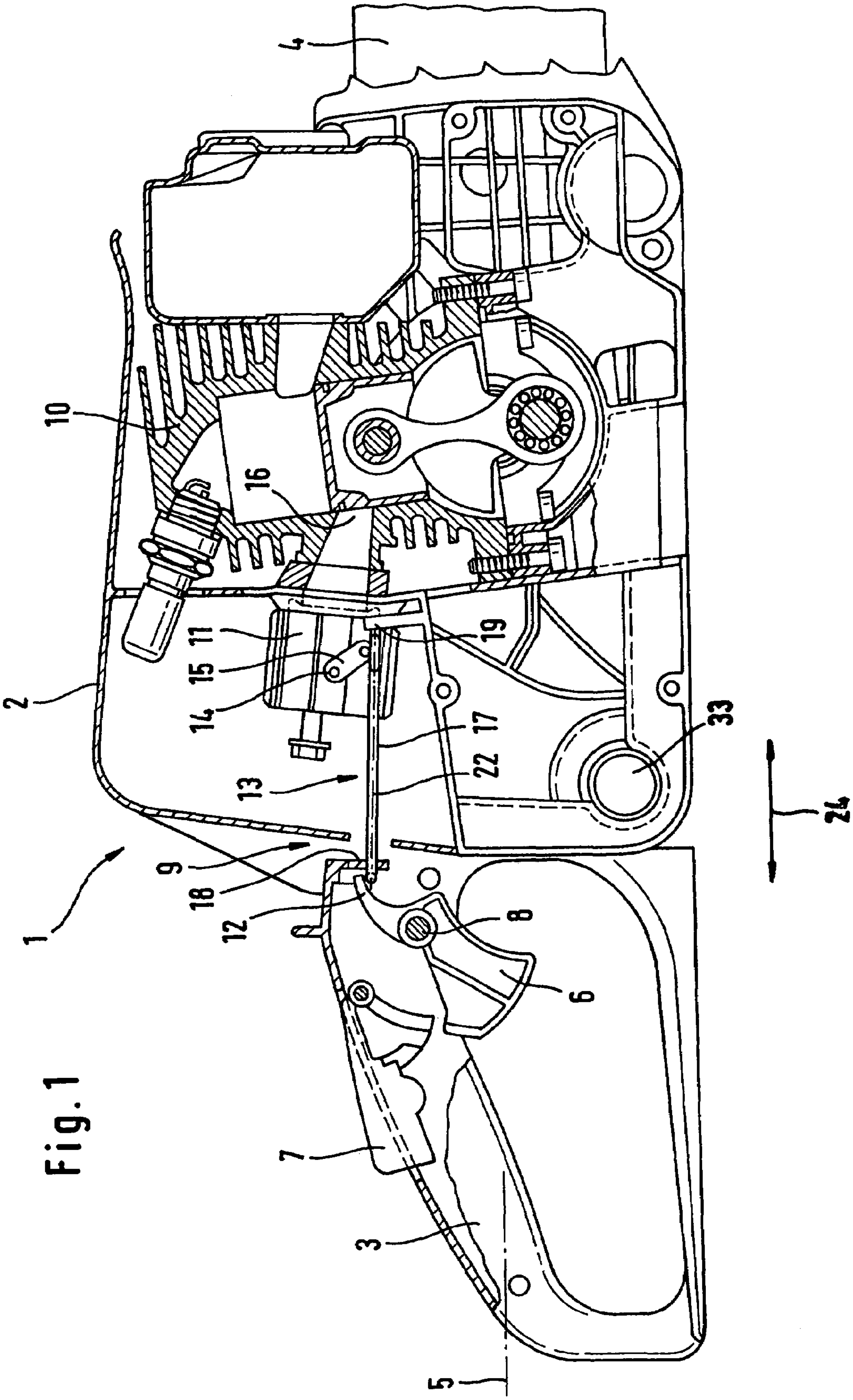
FIG. 1 is a schematic longitudinal section view of a motor-driven chain saw.

The motor-driven chain saw 1 shown in FIG. 1 includes a housing 2 on which a handle 3 is fixed via at least one antivibration element 33. The handle 3 is mounted at the end of the housing 2 facing away from a guide bar 4 for the saw chain of the chain saw 1 and extends approximately in the longitudinal direction 5 of the chain saw 1. The longitudinal direction 5 is the direction in which the guide bar 4 essentially extends. A throttle lever 6 is pivotally journalled on the handle 3 on a support bolt 8. Furthermore, a throttle lever latch 7 is provided which prevents an unwanted actuation of the throttle lever 6 out of the idle position. An actuating section 12 is formed on the region of the throttle lever 6 projecting into the interior of the handle 3 and this actuating section 12 acts on a transmitting unit 13.

The transmitting unit 13 includes a transmitting element 17 which extends approximately in the primary vibrating direction 24 of the chain saw 1. The primary vibration direction 24 lies approximately in the longitudinal direction 5 of the chain saw 1. The transmitting element 17 is rotatably journalled on the handle 3 at a first support 18 and on the housing 2 of the chain saw 1 at a second support 19. The first support 18 is configured as a fixed support and the second support 19 is configured as a loose support so that the transmitting element 17 cannot be displaced at the first support 18 in its longitudinal direction and is held at the second support 19 to be displaceable in the longitudinal direction.

A vibration gap 9 is formed between the housing 2 and the handle 3 and this gap 9 is bridged by the transmitting element 17. The transmitting element 17 lies transversely to the vibration gap 9 and is especially approximately perpendicular thereto. The transmitting element 17 transmits the pivot movement of the throttle lever 6 about the support bolt 8 as a rotation about a rotational axis 22 which lies especially in the primary vibration direction 24. Relative movements of the handle 3 relative to the housing 2 (which movements lie in the direction of the rotational axis 22, that is, especially in the primary vibration direction 24) are not transmitted via the transmitting element 17.

An internal combustion engine 10 is mounted in the housing 2 and this engine is especially configured as a two-stroke engine. The engine 10 has a carburetor 11 which supplies an air/fuel mixture to the engine 10 via an inlet 16. In lieu of the carburetor 11, another fuel-metering device can be provided on which the throttle lever 6 acts. In this carburetor 11, an intake channel section (not shown in FIG. 1) is formed wherein a throttle flap is pivotally journalled. The throttle flap is fixed on a throttle shaft 14 which extends up to the outer side of the housing of the carburetor 11. A lever 15 is fixed to the throttle shaft 14 and the transmitting element 17 acts on this lever 15.

Figure 2:
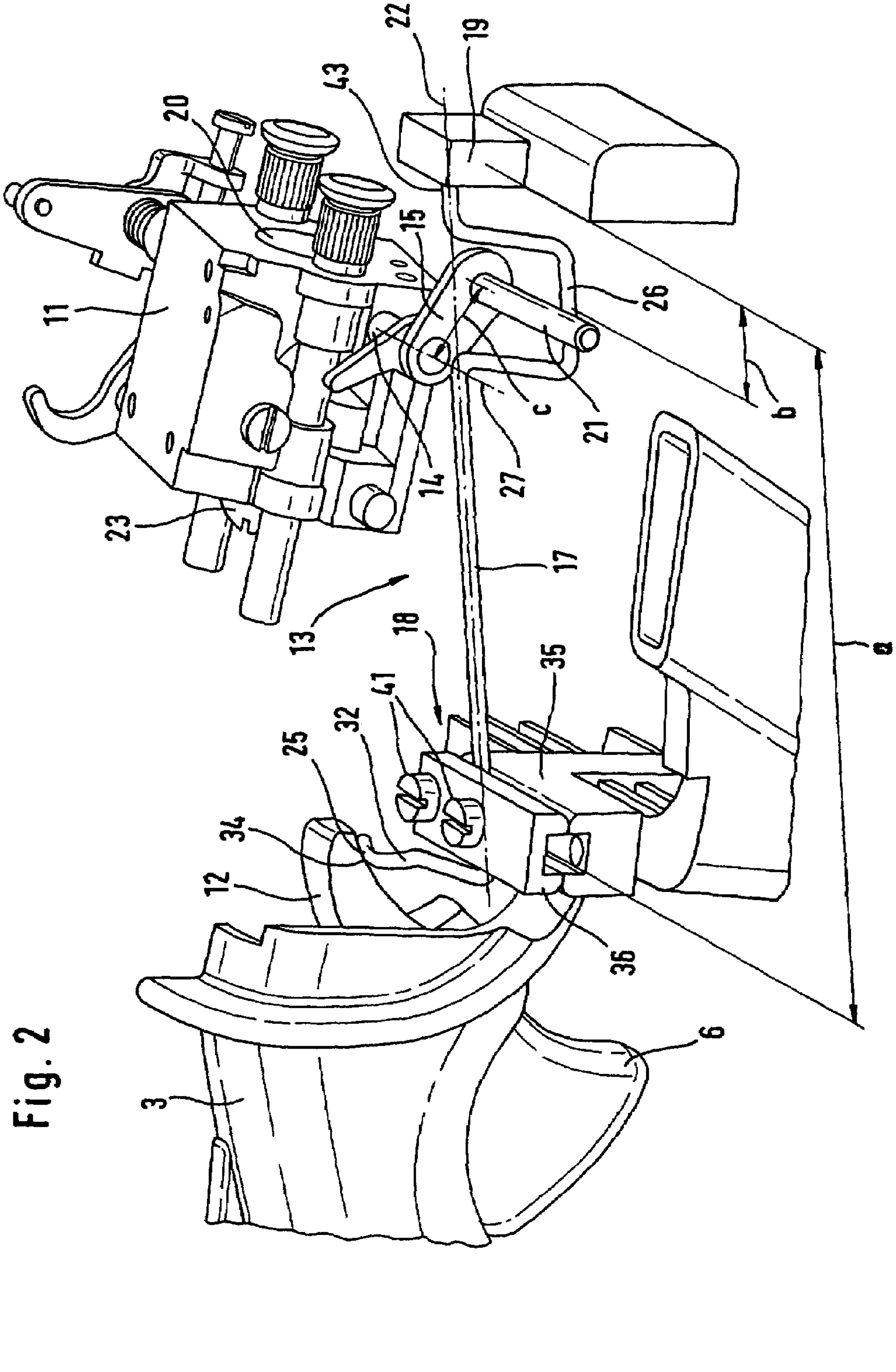
FIG. 2 is a perspective view of the transmitting unit.

FIG. 2 is an enlarged perspective view of the transmitting unit 13. The actuating section 12 of the throttle lever 6 acts on a first region 25 of the transmitting unit 13 and this first region 25 is disposed on a projecting arm 32. The arm 32 extends approximately at right angles to the transmitting element 17 and extends radially outwardly relative to the rotational axis 22. The bearing or support bolt 8 of the throttle lever 6 extends approximately perpendicularly to the rotational axis 22 and is approximately parallel to the arm 32 in the half-throttle position of the carburetor 11. With the actuation of the first region 25, a relative movement thereby results between the actuating section 12 and the first region 25. In order to reduce occurring friction, the actuating region 34 (against which the first region 25 lies at the actuating section 12) is configured to be concave. The first support 18 is formed by two support elements (35, 36). The support element 36 is connected to the support element 35 via two screws 41 which are arranged at both sides of the transmitting element 17. The support 18 is configured as a fixed support and does not permit translatory movements of the transmitting element 17 but permits a rotational movement in each direction over a needed range. Other configurations of the support 18 can be advantageous. To limit the path of the transmitting element 17 in the direction of the rotational axis 22 at the support 18, a stop can be provided which, for example, can be formed on the transmitting element 17 or the stop can be formed as a widening by squeezing the transmitting element 17. The transmitting element 17 is configured as a bent wire. However, another configuration can also be practical.

End 43 (FIG. 2) faces toward the internal combustion engine 10 shown in FIG. 1. At end 43, the transmitting unit 13 is held loosely on the second support 19 in the direction of the rotational axis 22 and is rotatably journalled about the rotational axis 22. A second region 26 is formed between the first support 18 and the second support 19. This second region 26 acts on the throttle shaft 14 of the carburetor 11. The wire, which forms the transmitting unit 13, is bent over to have a U-shape at the second region 26. The second region 26 extends parallel to the rotational axis 22 at a radial distance thereto. A dog 21 of the carburetor 11 lies on the second region 26. The dog 21 is mounted on the throttle shaft 14 via the lever 15 so as to rotate therewith. The dog 21 extends approximately parallel to the rotational axis 27 of the throttle shaft 14 at a distance (c) to the latter. The two supports 18 and 19 are at a distance (a) from each other which is essentially greater than the distance (b) of the second region 26 to the second support 19. The second support 19 is mounted directly adjacent the second region 26.

Relative movements of the two supports (18, 19) in a direction perpendicular to the rotational axis 22 are transmitted to the throttle shaft 14 only greatly reduced because of the lever ratios so that a substantial decoupling results also from movements perpendicular to the primary vibration direction 24.

A choke flap 23 is pivotally journalled in the intake channel 20 of the carburetor 11 upstream of the throttle flap (not shown). The position of the choke flap 23 can be coupled to the position of the throttle flap. Here, it should be ensured that the throttle flap is substantially closed when the choke flap 23 is closed. The wire can form the entire transmitting unit 13; however, it can also be practical to configure the regions 25 and 26 as separate components, for example, as cams which are fixed on the wire forming the transmitting element 17.

Figure 3:
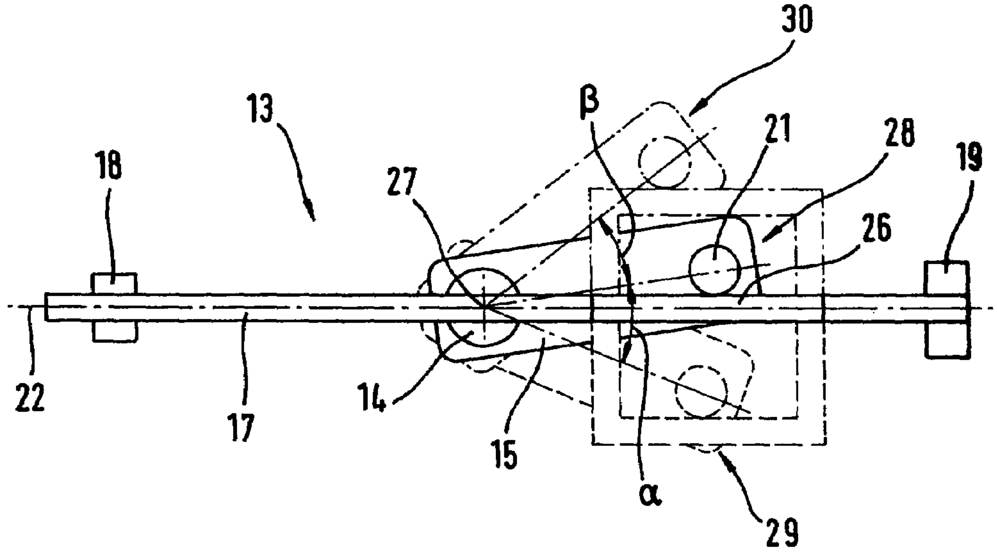
FIG. 3 is a side elevation view of the transmitting unit according to the embodiment of the invention shown in FIG. 2.

In FIG. 3, the arrangement of the transmitting element 17 and the throttle shaft 14 is emphasized. FIG. 3 shows a side elevation view of the transmitting unit 13 shown in FIG. 2 in the direction of the rotational axis 27 of the throttle shaft 14. The rotational axis 27 intersects the rotational axis 22 of the transmitting element 17. The rotational axis 22 and the rotational axis 27 thereby lie in one plane. The dog 21 lies against the second region 26 of the transmitting unit 13. The throttle shaft 14 is spring biased in a direction toward the closing position of the throttle flap, that is, in the clockwise direction in. FIG. 3. For this reason, the dog 21 is pressed against the second region 26. In the half-throttle position 28, which is shown in FIG. 3 by a solid line, the second region 26 lies approximately in the plane defined by the rotational axis 22 and the rotational axis 27.

The idle position 29 is shown in phantom outline in FIG. 3. In this position, the throttle shaft 14 is rotated about the rotational axis 27 through an angle $\alpha$ in a clockwise direction relative to the half-throttle position 28 shown in FIG. 3. In the full-load position 30, which is shown by the dash-dotted line in FIG. 3, the throttle shaft 14 is rotated in the counter clockwise direction through an angle $\beta$ relative to the half-throttle position 28. The idle position 29 and the full-load position 30 are approximately symmetrical to the half-throttle position 28 so that the relative movement of the dog 21 relative to the second region 26 is minimized between the idle position 29 and the full-load position 30. The angles $\alpha$ and $\beta$ are approximately equal. The rotational axis 27 of the throttle shaft 14 can also have a slight distance to the rotational axis 22. The distance is short relative to the movement of the dog 21 from the idle position 29 to the full-load position 30 and is only a fraction of the dog movement.

Figure 4:
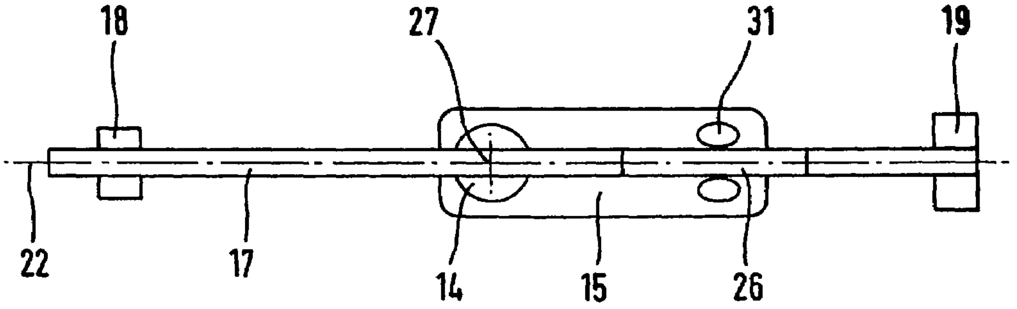
FIG. 4 is a schematic side elevation view of a transmitting unit according to another embodiment of the invention; and, FIGS. 5 and 6 show perspective views of still another embodiment of a transmitting unit in accordance with the invention.

FIG. 4 shows an embodiment incorporating a dog 31. The dog 31 is bifurcated and extends above and below the transmitting unit 13 at the second region 26. A slight play is present between the dog 31 and the second region 26 so that jamming of the dog 31 at the second region 26 is avoided because of the relative movement of the dog 31 and the second region 26. A forced guidance of the throttle shaft 14 is guaranteed by the bifurcated configuration of the dog 31 so that even when there is a malfunction of the spring, which presses the throttle flap into its closed position (that is, at the idle position 29), a closure of the throttle flap from the full-load position 30 is possible because the dog 31 is entrained and taken along to the second region 26 even for a movement from the full-load position 30 into the idle position 29. In lieu of the bifurcated dog 31, a slide sleeve can be provided on which the lever 15 is fixed and which slide sleeve is slidably journalled on the second region 26. It can be also be practical to configure the second region 26 as an elongated slot in which the dog is guided.

Figure 6:
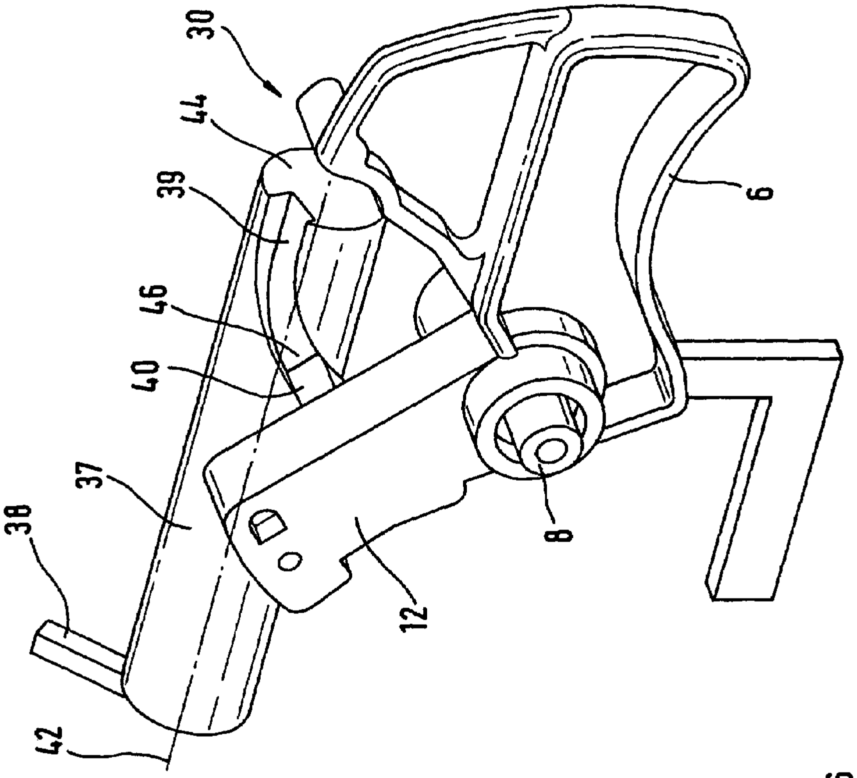
Figure 5:
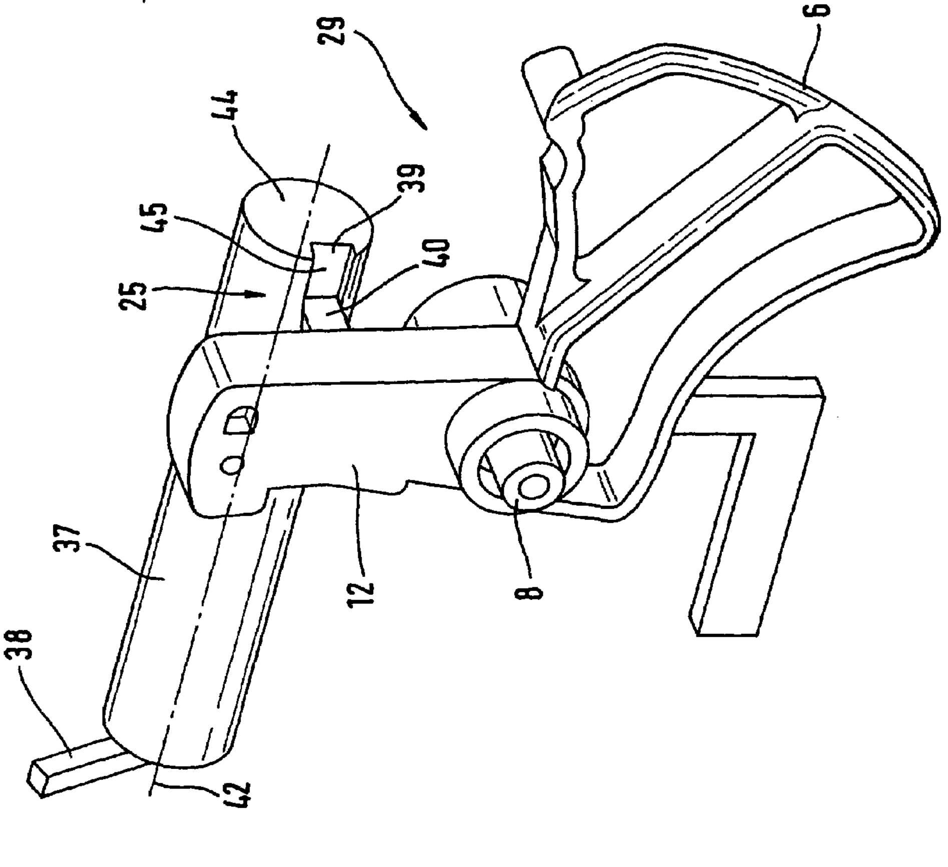

The embodiment shown in FIGS. 5 and 6 includes a transmitting element 37 which is configured as a shaft. The transmitting element 37 is rotatably journalled about the rotational axis 42. The arrangement of the supports corresponds to those of supports 18 and 19. A slot 39 is provided at the end 44 of the transmitting element 37 which faces toward the throttle lever 6. The slot 39 extends helically about the rotational axis 42 and defines the first region 25 of the transmitting unit. A lug 40 is guided in the slot 39 and this lug projects laterally at a radial distance to the bearing bolt 8 of the throttle lever 6 at the actuating section 12 of the throttle lever. The lug extends approximately radially to the rotational axis 42.

In the idle position 29 shown in FIG. 5, the lug 40 is arranged in the slot 39 in the region of the first end 45. When pivoting the throttle lever 6 as shown in FIGS. 5 and 6 in a counter clockwise direction (that is, from the idle position 29 shown in FIG. 5 into the full-load position 30 shown in FIG. 6), the lug 40 moves in the slot 39 from the first end 45 to the opposite-lying second end 46. Because of the helically-shaped configuration of the slot 39, the movement of the lug 40 effects a rotation of the transmitting element 37 about the rotational axis 42. At the end of the transmitting element 37, which lies opposite the slot 39, an arm 38 is arranged which projects radially from the transmitting element 37 and on which the second region 26 is formed. The second region 26 acts on the throttle shaft 14. The arm 38 can then act directly on the lever 15 of the throttle shaft 14.

Other configurations of the first region 25 and of the second region 26 can be advantageous. For example, the second region 26 can also be configured as a cam which acts on a conically-shaped dog on the lever 15 of the throttle shaft 14. In this way, a minimization of the relative movement and of the friction forces between the dog and the second region 26 is possible.

Other configurations of the transmitting unit can also be advantageous. The pivotal movement of the throttle lever can also be transmitted via a Bowden thrust to the throttle shaft. Also, the transmission via a fluid system can be practical. Here, the actuating movement can be transmitted via a first piston, on which the throttle lever acts, through a flexible, pressure-tight, fluid-filled line to a second piston which acts on the throttle shaft.

It is understood that the foregoing description is that of the preferred embodiments of the invention and that various changes and modifications may be made thereto without departing from the spirit and scope of the invention as defined in the appended claims.

What is claimed is:

1. A portable handheld work apparatus comprising:

a housing;

an internal combustion engine mounted in said housing;

a fuel-metering device for metering fuel to said internal combustion engine;

a handle;

at least one antivibration element connecting said handle to said housing;

said handle and said housing conjointly defining a vibration gap therebetween;

a throttle lever pivotally journalled on said handle so as to execute a pivotal movement;

a transmitting unit for transmitting said pivotal movement of said throttle lever to said fuel-metering device;

said transmitting unit including: a rigid transmitting element for bridging said vibration gap; support means for rotatably supporting said transmitting element for rotation about a rotational axis transverse to said vibration gap;

said handle undergoing movements relative to said housing in a direction along said rotational axis during operation of said work apparatus;

said support means further supporting said transmitting element so as not to permit said movements to be transmitted by said transmitting element; and, interface means for operatively connecting said throttle lever to said transmitting element so as to cause said transmitting element to transmit said pivotal movement as a rotation about said rotational axis.

2. The portable work apparatus of claim 1, wherein said rigid transmitting element is configured as a rigid wire.

3. The portable work apparatus of claim 1, wherein said portable work apparatus is a motor-driven chain saw.

4. The portable work apparatus of claim 1, wherein said throttle lever defines a pivot axis; and, said rotational axis is arranged approximately perpendicular to said pivot axis of said throttle lever.

5. The portable work apparatus of claim 1, wherein said transmitting unit has a first region whereupon said throttle lever acts and a second region for acting on said fuel-metering device; and, said throttle lever and said first region conjointly define said interface means.

6. The portable work apparatus of claim 5, wherein said first region is disposed on an arm projecting from said rigid transmitting element.

7. The portable work apparatus of claim 5, wherein said throttle lever has a lug fixedly disposed thereon; and, said first region is configured to define a helical slot on said rigid transmitting element for guiding said lug therein.

8. The portable work apparatus of claim 5, wherein said second region is configured as a projecting arm.

9. The portable work apparatus of claim 8, wherein said rigid transmitting element is a shaft.

10. The portable work apparatus of claim 5, wherein said fuel-metering device is a carburetor having a throttle shaft; said interface means is a first interface means and said portable work apparatus further comprises second interface means for operatively connecting said second region to said throttle shaft so as to permit said second region to act on said throttle shaft.

11. The portable work apparatus of claim 10, wherein said rotational axis is a first rotational axis; and, said throttle shaft defines a second rotational axis extending transversely to said first rotational axis.

12. The portable work apparatus of claim 11, wherein said first rotational axis, said second rotational axis and said second region all lie in a common plane.

13. The portable work apparatus of claim 11, wherein said second region is parallelly offset with respect to said first rotational axis.

14. The portable work apparatus of claim 11, wherein said second interface means includes a dog fixedly mounted on said throttle shaft and disposed at a third distance (c) from said second rotational axis so as to permit said second region of said transmitting unit to act thereupon.

15. The portable work apparatus of claim 14, wherein said second rotational axis is at a small distance from said first rotational axis referred to the movement of said dog from the idle position to the full-load position of said carburetor.

16. The portable work apparatus of claim 14, wherein said second rotational axis intersects said first rotational axis.

17. A portable handheld work apparatus comprising:

a housing;

an internal combustion engine mounted in said housing;

a fuel-metering device for metering fuel to said internal combustion engine;

a handle;

at least one antivibration element connecting said handle to said housing;

said handle and said housing conjointly defining a vibration gap therebetween;

a throttle lever pivotally journalled on said handle so as to execute a pivotal movement;

a transmitting unit for transmitting said pivotal movement of said throttle lever to said fuel-metering device;

said transmitting unit including: a rigid transmitting element for bridging said vibration gap; support means for rotatably supporting said transmitting element so as to permit rotation thereof about a rotational axis transverse to said vibration gap;

interface means for operatively connecting said throttle lever to said transmitting element so as to cause said transmitting element to transmit said pivotal movement as a rotation about said rotational axis;

said rotational axis being a first rotational axis;

said fuel metering device having a throttle shaft; and, said throttle shaft defining a second rotational axis extending transversely to said first rotational axis.

18. A portable handheld work apparatus comprising:

a housing;

an internal combustion engine mounted in said housing;

a fuel-metering device for metering fuel to said internal combustion engine;

a handle;

at least one antivibration element connecting said handle to said housing;

said handle and said housing conjointly defining a vibration gap therebetween;

a throttle lever pivotally journalled on said handle so as to execute a pivotal movement;

a transmitting unit for transmitting said pivotal movement of said throttle lever to said fuel-metering device;

said transmitting unit including: a rigid transmitting element for bridging said vibration gap; support means for rotatably supporting said transmitting element so as to permit rotation thereof about a rotational axis transverse to said vibration gap;

interface means for operatively connecting said throttle lever to said transmitting element so as to cause said transmitting element to transmit said pivotal movement as a rotation about said rotational axis;

said transmitting unit having a first region whereupon said throttle lever acts; and, said first region being disposed on an arm projecting from said rigid transmitting element.

19. A portable handheld work apparatus comprising:

a housing;

an internal combustion engine mounted in said housing;

a fuel-metering device for metering fuel to said internal combustion engine;

a handle;

at least one antivibration element connecting said handle to said housing;

said handle and said housing conjointly defining a vibration gap therebetween;

a throttle lever pivotally journalled on said handle so as to execute a pivotal movement;

a transmitting unit for transmitting said pivotal movement of said throttle lever to said fuel-metering device;

said transmitting unit including: a rigid transmitting element for bridging said vibration gap; support means for rotatably supporting said transmitting element so as to permit rotation thereof about a rotational axis transverse to said vibration gap;

interface means for operatively connecting said throttle lever to said transmitting element so as to cause said transmitting element to transmit said pivotal movement as a rotation about said rotational axis;

said support means including a first support for supporting said rigid transmitting element so that said rigid transmitting element is non-displaceable in the direction of said rotational axis; and, a second support for supporting said rigid transmitting element so as to permit a relative displacement between said rigid transmitting element and said second support in the direction of said rotational axis thereby compensating for relative movement between said handle and said housing.

20. The portable work apparatus of claim 19, wherein one of said supports is mounted on said handle and the other one of said supports is mounted on said housing.

21. The portable work apparatus of claim 20, wherein said first support is mounted on said handle and said second support is mounted on said housing.

22. The portable work apparatus of claim 19, wherein said transmitting unit has a first region whereupon said throttle lever acts and a second region for acting on said fuel-metering device; and, said throttle lever and said first region conjointly define said interface means.

23. The portable work apparatus of claim 22, wherein said first support is arranged between said first region and said second region.

24. The portable work apparatus of claim 23, wherein said second region has a side facing away from said first region; and, said second support is disposed at said side of said second region.

25. The portable work apparatus of claim 24, wherein said second support is at a first distance (b) from said second region and said second support is at a second distance (a) from said first support; and, said first distance (b) is short compared to said second distance (a).

* * * * *